Figure 2:
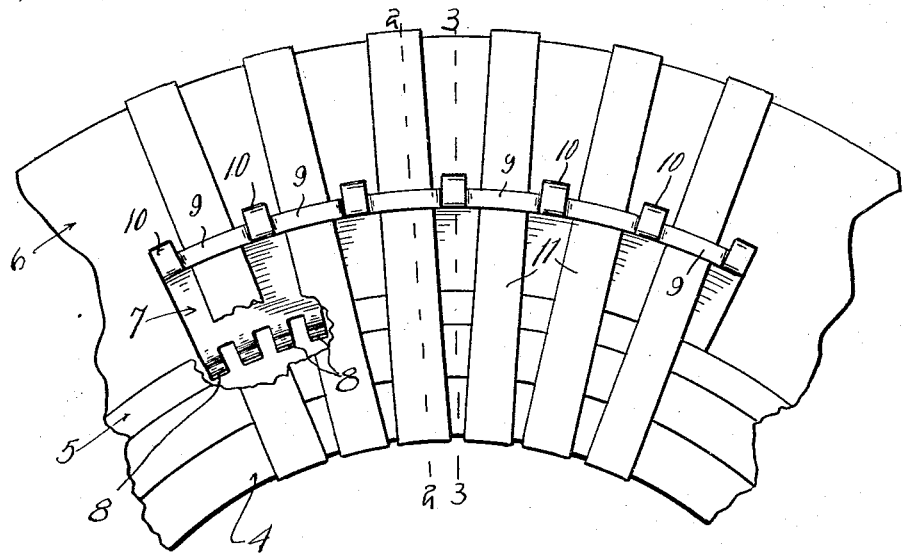

A. G. HOLEN.
ATTACHMENT FOR AUTO TIRES.
APPLICATION FILED MAR. 7, 1916.

1,198,548.

Patented Sept. 19, 1916.

FIG. I.

Witnesses
J. C. Simpson
V. B. Gatt

Inventor
A. G. Holen
By Chandler & Chandler
Attorney

UNITED STATES PATENT OFFICE.

ALBERT G. HOLEN, OF NORTHFIELD, WISCONSIN.

ATTACHMENT FOR AUTO-TIRES.

1,198,548. Specification of Letters Patent. Patented Sept. 19, 1916.

Application filed March 7, 1916. Serial No. 82,692.

*To all whom it may concern:*

Be it known that I, ALBERT G. HOLEN, a citizen of the United States, residing at Northfield, in the county of Jackson, State of Wisconsin, have invented certain new and useful Improvements in Attachments for Auto-Tires; and I do hereby declare the following to be a full, clear, and exact description of the invention, such as will enable others skilled in the art to which it appertains to make and use the same.

This invention relates to attachments for vehicle tires, and is adapted particularly for use in connection with pneumatic tires.

The primary object of the invention is to provide a device capable of ready adjustment to a vehicle tire of the above mentioned character which will serve as an efficient means for closing a "rim cut" in the tire to prevent further tearing of the tire, and to prevent sand or dirt gaining access to the interior of the outer tube.

A further object of the invention is to provide a device of the character thus briefly described which is capable of application to various sizes and types of vehicle tires now generally in use, which is simple and inexpensive of construction, which is capable of being readily attached to or detached from a vehicle wheel, which cannot in any way injure the tire, and which will occupy but small space in a tool box.

A still further object of the invention is to provide a device of this character which may with facility be used in connection with blow out patches to render the latter more efficient in practice.

With these objects in view, together with others which will appear as the description proceeds, the invention resides in the novel combination and arrangement of parts, all as will be described more fully hereinafter, illustrated in the drawings and particularly pointed out in the claims.

Figure 3:
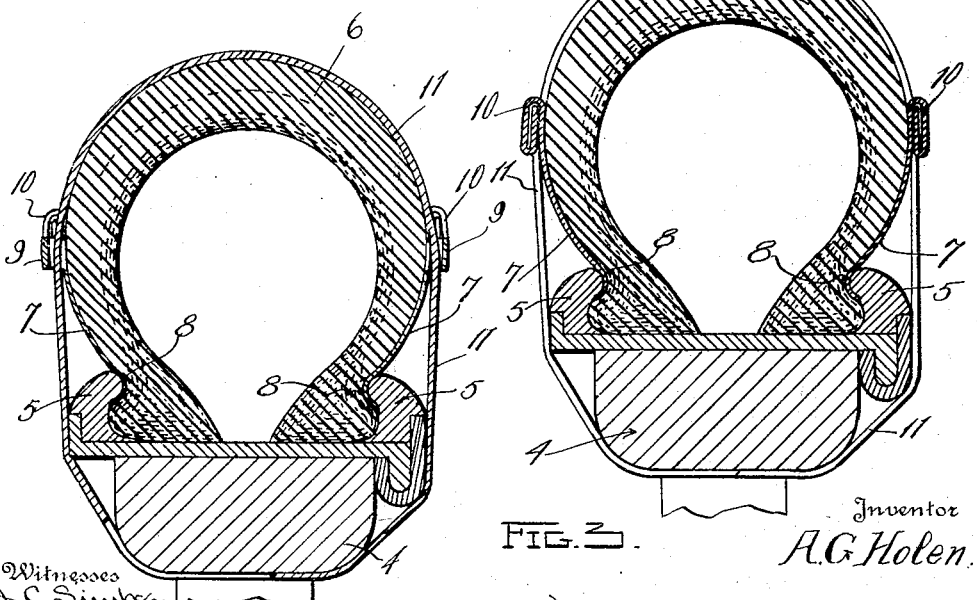

The invention will be best understood by reference to the accompanying drawings, wherein:

Figure 1 is a fragmentary side elevation of a conventional form of wheel rim and tire, and illustrating the application of a device embodying my invention. Fig. 2 is a sectional view taken on line 2—2 of Fig. 1, and Fig. 3 is a sectional view taken on line 3—3 of Fig. 1.

Referring now more particularly to the drawings 4 indicates a wheel felly which is preferably constructed for the accommodation of detachable pneumatic tires, the hooked rings 5 being provided at the lateral edges of the rim for the purpose of holding the tire 6 firmly seated upon the rim.

As is well known to those familiar with vehicles employing pneumatic tires, the latter, upon complete or partial deflation become torn or cut adjacent the juncture of the tire with the securing rims or clencher members, and it is the object of the present invention to patch and protect such cut portions of the tire to prevent further tearing or cutting of the same, and to prevent dirt and sand from gaining access to the interior of the tube. To this end, plates 7 formed of suitable metal, such as steel or aluminum, are provided. These plates are adapted for arrangement upon each side of the tire, and may be of varied sizes. Each of the plates is preferably formed of a curvature equal to that of the circumference of the wheel rim, and may be inserted along its lowermost arcuate longitudinal edge to provide outwardly projecting spaced hooks 8 for engagement beneath the tire retaining loops or clencher members 5 upon the exterior of the tire. Each plate is of a width sufficient to extend practically one half the distance to the tread portion of the tire, being provided adjacent its outer longitudinal edge with a plurality of spaced transversely disposed loop members 9. These loop members may be stamped from the body portion of the plate itself, or may be secured on the plate as desired. The portions of the plate 7 between the loop members 9 are turned or rolled backwardly and outwardly to provide beads or fillers 10 between the adjacent ends of the spaced loop members and fitting snugly therebetween. When the plates have been thus arranged one upon each side of the tire, straps 11 may be passed through the loop members 9 around the tire and through the corresponding loops on the opposite plate, and the said strap ends secured beneath the felly 4. When thus attached to the tire, it is apparent that the same may be freely used without danger of further injury to the tire. The plates 7 which have been disposed over the cut portions of the tire, will prevent further engagement of the rim with that portion, and will also prevent sand or dirt gaining access to the interior of the outer casing. The bead portion between the loop members support the latter to prevent flattening of the same when the wheel passes through ruts or uneven surfaces in the roadway. It will also be observed that the rounded or blunt surfaces presented by the outward extremities of the filler members or beads 10 prevents the plate from cutting into the tire. It is also obvious that plates of this construction might with facility be applied to a tire beneath a patch to assist the latter in properly protecting the tire casing. By reason of the simplicity of the construction of the plates it is apparent that the same may be quickly and easily applied to a tire without the necessity of special knowledge or tools, and the particular construction permits of the device being readily applied to tires of various types, and employing various means of securing the same to the rim.

While I have herein shown and described a particular or preferred embodiment of my invention, I need not confine myself to all the precise details of construction herein set forth by way of illustration, as modification and variation may be made without departing from the spirit of the invention or exceeding the scope of the claims.

I claim:

1. In a device of the class described, the combination with a demountable tire; of a plate adapted to rest upon the side of said tire, hooks at one edge of said plate for engagement under the tire rim of said wheel, transversely disposed loops at the opposite edge of said plate, and filler members between said loops, substantially as described.

2. In a device of the class described, the combination with a demountable tire; of a plate adapted to rest upon the side of said tire, hooks at one edge of said plate for engagement under the tire rim of said wheel, transversely disposed spaced loops at the opposite edge of said plate, straps inserted through said loops and encircling said tire, and filler members formed on said plate between the adjacent edges of said spaced loops, substantially as described.

3. In a device of the class described, the combination with a demountable tire; of a pair of plates having arcuate longitudinal edges adapted to be positioned upon each side of said tire, hooks projecting outwardly from one of the longitudinal edges of each of said plates for engagement beneath the tire retaining rim of said wheel, spaced transversely disposed loops at the opposite longitudinal edge of each of said plates and upon the outer surface thereof, beads comprising portions of said plates bent backwardly from said last named edge thereof to rest between said spaced loops and engaging the adjacent edges thereof, and straps passed around said tire through the loops upon said opposite plates and secured at their ends adjacent said wheel rim, substantially as described.

In testimony whereof, I affix my signature, in the presence of two witnesses.

ALBERT G. HOLEN.

Witnesses:
H. A. M. STEEN,
OLGER M. STEEN.

Copies of this patent may be obtained for five cents each, by addressing the "Commissioner of Patents, Washington, D. C."